(12) United States Patent
Lee

(10) Patent No.: US 7,486,032 B2
(45) Date of Patent: Feb. 3, 2009

(54) APPARATUS FOR DRIVING LED ARRAYS

(75) Inventor: Sang Yun Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/730,986

(22) Filed: Apr. 5, 2007

(65) Prior Publication Data

US 2007/0236154 A1    Oct. 11, 2007

(30) Foreign Application Priority Data

Apr. 7, 2006    (KR) .................... 10-2006-0031883

(51) Int. Cl.
*H05B 37/02*    (2006.01)

(52) U.S. Cl. .................... 315/291; 315/246; 315/247; 315/312

(58) Field of Classification Search ............. 315/209 R, 315/224–226, 246–247, 291, 307–308, 312, 315/DIG. 4; 345/82, 84, 102, 204; 362/227, 362/612, 800
See application file for complete search history.

(56) References Cited

U.S. PATENT DOCUMENTS

| | | | |
|---|---|---|---|
| 2002/0057061 A1* | 5/2002 | Mueller et al. .............. | 315/291 |
| 2005/0168168 A1* | 8/2005 | Elliott ......................... | 315/247 |
| 2006/0082331 A1* | 4/2006 | Ashdown .................... | 315/291 |
| 2007/0040512 A1* | 2/2007 | Jungwirth et al. ........... | 315/159 |
| 2007/0080911 A1* | 4/2007 | Liu et al. ..................... | 345/82 |

* cited by examiner

*Primary Examiner*—David Hung Vu
*Assistant Examiner*—Tung X Le
(74) *Attorney, Agent, or Firm*—McDermott Will & Emery LLP

(57) ABSTRACT

In an apparatus for driving LED arrays, a dimming/size setter sets each of driving voltages for a plurality of red, green and blue LED arrays in response to at least one of a dimming signal and a size control signal inputted from outside. Each of red LED array driving circuits is commonly connected to the dimming/size setter, and switches on/off a supply voltage by PWM to supply the driving voltage set by the dimming/size setter. Each of green LED array driving circuits is commonly connected to the dimming/size setter, and switches on/off a supply voltage by PWM to supply the driving voltage set by the dimming/size setter. Also, each of blue LED array driving circuits is commonly connected to the dimming/size setter, and switches on/off a supply voltage by PWM to supply the driving voltage set by the dimming/size setter.

4 Claims, 4 Drawing Sheets

APPARATUS FOR DRIVING LED ARRAYS

CLAIM OF PRIORITY

This application claims the benefit of Korean Patent Application No. 2006-31883 filed on Apr. 7, 2006 in the Korean Intellectual Property Office, the disclosure of which is incorporated herein by reference.

BACKGROUND OF THE INVENTION

1. Field of the Invention

The present invention relates to an apparatus for driving light emitting diode (LED) arrays, and more particularly, to an apparatus for driving a plurality of red, green and blue LED arrays used as a direct-type LCD backlight, in which fewer number of parts are required to minimize the apparatus and save manufacturing costs thereof.

2. Description of the Related Art

A cold cathode fluorescent lamp (CCFL) has been conventionally utilized as a light source of a light crystal display (LCD) backlight. The CCFL may trigger environmental pollution due to use of a mercury gas. Also, the CCFL is low in response rate and color reproducibility, and inadequate for reducing the weight and size of an LCD panel.

In contrast, a light emitting diode (LED) is environment-friendly and can respond fast with several nano seconds, thus effective in video signal stream. Moreover, the LED can be impulsively driven, reproduce colors by 100% or more and arbitrarily change brightness and color temperature by adjusting a light amount of red, green and blue LEDs. Also, the LED carries advantages leading to a lighter weight and smaller sized LCD panel. Thus the LED is actively adopted as a backlight source of the LCD panel.

In general, the LCD backlight employing the LEDs includes an edge-type backlight and a direct-type backlight depending on location of a light source. In the former, a light source is shaped as an elongated bar and disposed at a side of a light guide plate to irradiate light onto the LCD panel. In the latter, a surface light source is substantially identical in size to the LCD panel and disposed under the LCD panel to directly irradiate light onto the LCD panel.

Meanwhile, a white light emitting diode has yet to be developed. Thus, typically, the LED for use in the LCD backlight generates white light by combining a red LED, a green LED and a blue LED together. To emit white light uniformly onto an entire area of the LCD, various LED arrangements have been studied. Also, under development are technologies for properly controlling brightness and colors of the LCD backlight by effectively supplying a driving current (driving voltage) to the LEDs of each color.

FIG. 1 is a block diagram illustrating an example of a conventional apparatus for driving LED arrays. Referring to FIG. 1, the conventional apparatus for driving LED arrays include a plurality of LED array driving boards 10. Typically, a light source 20 used as an LCD backlight is provided with a plurality of red, green and blue LED arrays 21, 22, and 23 on a board. To effectively drive the LED arrays, one or more LED arrays 21, 22 and 23 are fabricated as a module or arranged in a predetermined area. Here, each of the LED array driving boards 10 is provided to the LED arrays of each color 21, 22 and 23 located in the module or area.

The LED array driving boards 10 each include a dimming/size setter 11, red/green/blue PWM controllers 121, 131 and 141, and DC/DC converters 122, 132 and 142. The dimming/size setter 11 sets a driving voltage to be supplied to the LED arrays 21, 22, and 23 of each color in response to a dimming control signal $S_D$ and a size control signal $S_A$ inputted from inside and outside. The red/green/blue PWM controllers 121, 131 and 141 each generate a PWM control signal to supply the driving voltage set by the dimming/size setter 11 to the LED arrays of each color 21, 22 and 23. The DC/DC converters 122, 132 and 142 generate static power by phase width modulation (PWM) in response to the PWM control signal.

In the conventional apparatus for driving LED arrays configured as above, an LED array driving board is required to drive the red/green/blue LEDs located in a module or a predetermined area. Thus, increase in the number of modules or blocks having the LED arrays therein leads to increase in the number of the driving boards and accordingly the number of parts required for the driving apparatus. This consequently adds to the size and volume of the driving apparatus, which thus should be installed in a larger area. This adversely affects miniaturization of the product and increments costs for manufacturing or purchasing the parts, thereby raising manufacturing costs.

SUMMARY OF THE INVENTION

The present invention has been made to solve the foregoing problems of the prior art and therefore an aspect of the present invention is to provide an apparatus for driving LED arrays in which a dimming/size setter for setting a driving voltage is commonly applied to a plurality of LED array driving circuits each including a PWM controller for driving LED arrays of each color and a DC/DC converter.

According to an aspect of the invention, the apparatus for driving LED arrays includes a dimming/size setter for setting each of driving voltages for a plurality of red, green and blue LED arrays in response to at least one of a dimming signal and a size control signal inputted from outside; a plurality of red LED array driving circuits each commonly connected to the dimming/size setter, each of the red LED array driving circuits switching on/off a supply voltage by phase width modulation to supply the driving voltage set by the dimming/size setter; a plurality of green LED array driving circuits each commonly connected to the dimming/size setter, each of the red LED array driving circuits switching on/off a supply voltage by phase width modulation to supply the driving voltage set by the dimming/size setter; and a plurality of blue LED array driving circuits each commonly connected to the dimming/size setter, each of the red LED array driving circuits switching on/off a supply voltage by phase width modulation to supply the driving voltage set by the dimming/size setter.

According to a preferred embodiment of the invention, each of the red LED array driving circuits includes a DC/DC converter for switching on/off the supply voltage of the red LED arrays in accordance with a duty ratio of a pulse signal outputted from a phase width modulation driver to convert the supply voltage into the driving voltage; and a phase width modulation controller for generating a phase width modulation control signal to control the duty ratio of the pulse signal outputted from the phase width modulation driver so that the driving voltage of the red LED arrays set by the dimming/size setter is supplied to the red LED arrays.

Each of the green LED array driving circuits includes a DC/DC converter for switching on/off the supply voltage of the green LED arrays in accordance with a duty ratio of a pulse signal outputted from a phase width modulation driver to convert the supply voltage into the driving voltage; and a phase width modulation controller for generating a phase width modulation control signal to control the duty ratio of the pulse signal outputted from the phase width modulation controller so that the driving voltage of the green LED arrays set by the dimming/size setter is supplied to the green LED arrays.

Each of the blue LED array driving circuits includes a DC/DC converter for switching on/off the supply voltage of the blue LED arrays in accordance with a duty ratio of a pulse signal outputted from a phase width modulation driver to convert the supply voltage into the driving voltage; and a phase width modulation controller for generating a phase width modulation control signal to control the duty ratio of the pulse signal outputted from the phase width modulation driver so that the driving voltage of the blue LED arrays set by the dimming/size setter is supplied to the blue LED arrays.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
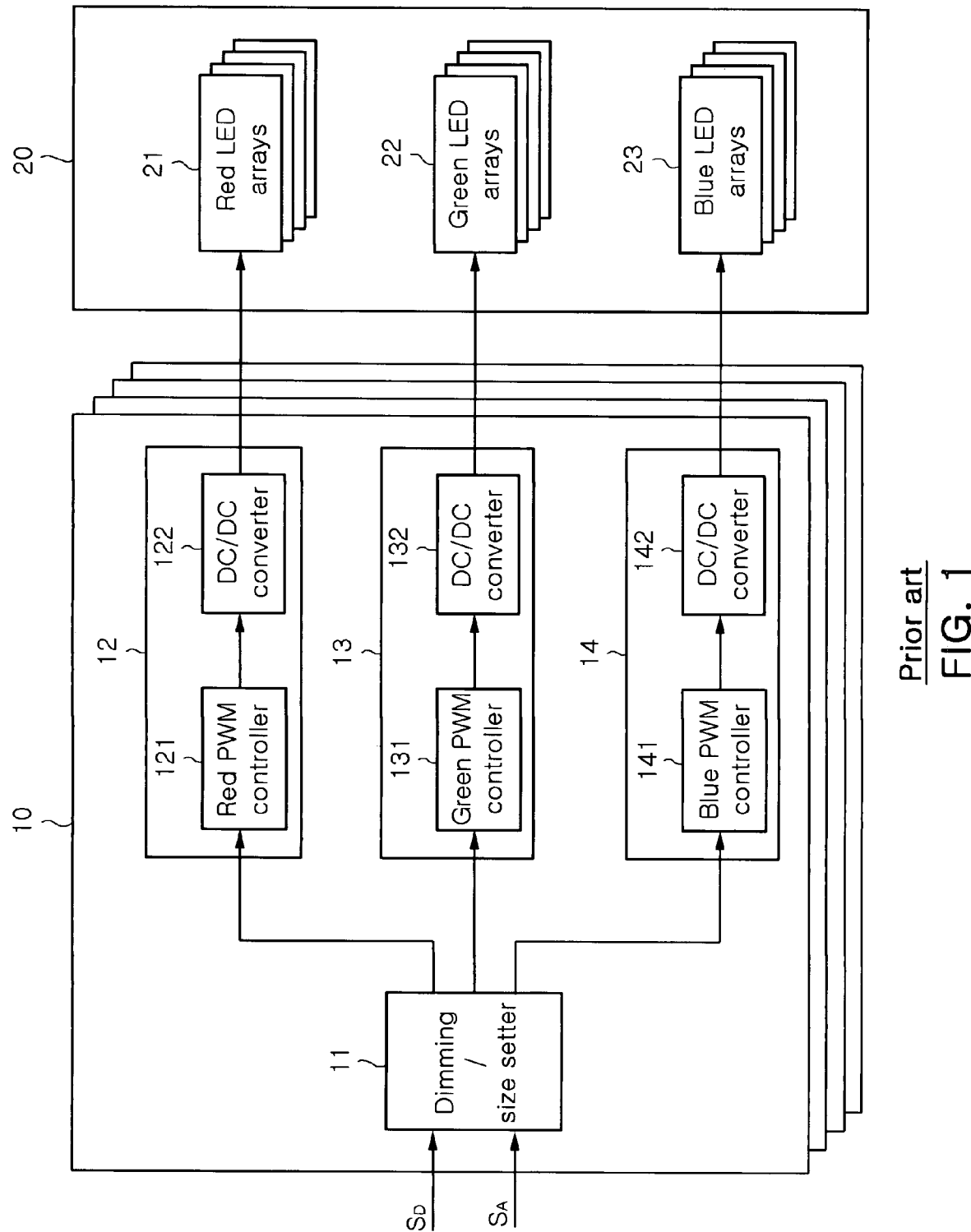
FIG. 1 is a block diagram illustrating an example of a conventional apparatus for driving LED arrays.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 2:
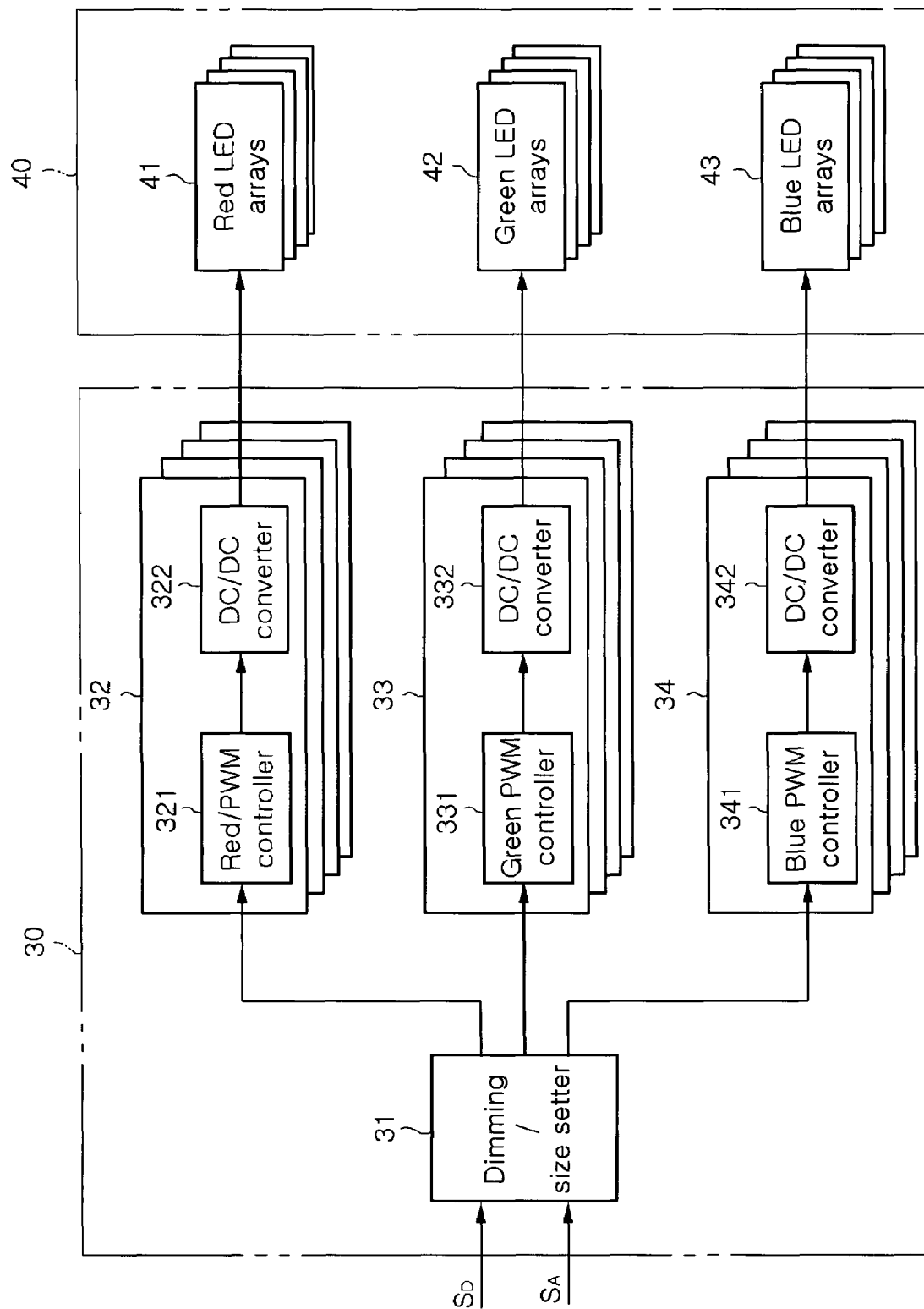
FIG. 2 is a block diagram illustrating an apparatus for driving LED arrays according to the invention.

FIG. 2 is a block diagram illustrating an apparatus for driving LED arrays according to the invention.

Referring to FIG. 2, the apparatus for driving LED arrays includes a dimming/size setter 31, a plurality of red LED array driving circuits 32, a plurality of green LED array driving circuits 33 and a plurality of blue LED array driving circuits 34.

The dimming/size setter 31 sets driving voltages for the red/green/blue LED arrays in response to a dimming control signal $S_D$ and/or a size control signal $S_A$ inputted from outside. The dimming control signal $S_D$ and/or the size control signal $S_A$ may be inputted to the dimming/size setter 31 from outside by the user's setting. Alternatively, the dimming control signal $S_D$ and/or the size control signal $S_A$ may be generated from a separate control signal which detects light emitted from a light source to accord with preset brightness and color coordinates. The dimming/size setter 31 receives the dimming control signal ($S_D$) and/or the size control signal ($S_A$), and sets a corresponding driving voltage. For example, to attain stronger red color in conformity with color coordinates, a signal set for increasing the driving voltage applied to red LED arrays 41 can be fed to the red LED array driving circuits 32, thereby increasing output of the red LED arrays 41.

According to characteristics of the invention, only one dimming/size setter 31 is provided and a set signal for the driving voltage outputted from the dimming/size setter 31 is fed to a plurality of the LED driving circuits of the same color. Conventionally, each of three-colored LED driving circuits is provided with a dimming/size setter. Thus, increase in the number of the LED arrays and accordingly LED driving circuits also proportionally increases the number of the dimming/size setter 31. On the other hand, according to the invention, the increase in the number of the LED arrays merely increases the number of the LED array driving circuits, still requiring only one dimming/size setter 31. This diminishes the number of the parts for the driving apparatus over the prior art.

Each of the red LED array driving circuits 32 is commonly connected to the dimming/size setter 31. The red LED array driving circuit 32 switches on/off a supply voltage by phase width modulation (PWM) to supply the driving voltage set by the dimming/size setter 31 to the red LED arrays 41.

Likewise, each of the green LED array driving circuits 33 is commonly connected to the dimming/size setter 31. The green LED array driving circuit 33 switches on/off a supply voltage by PWM to supply the driving voltage set by the dimming/size setter 31 to green LED arrays 42.

Likewise, each of the blue LED array driving circuits 34 is commonly connected to the dimming/size setter 31. The blue LED array driving circuit 33 switches on/off a supply voltage by PWM to supply the driving voltage set by the dimming/size setter 31 to blue LED arrays 43.

Each of the red/green/blue LED array driving circuits 32, 33 and 34 includes a DC/DC converter 322, 332 and 342 and a PWM controller 321, 331 and 341. The DC/DC converter 322, 332 and 342 switches on/off the supply voltage of the respective red/green/blue LED arrays 41, 42 and 43 in accordance with a duty ratio of a pulse signal outputted from a PWM driver to convert the supply voltage into the driving voltage. The PWM controller 321, 331 and 341 generates a PWM control signal to control the duty ratio of the pulse signal outputted from the PWM driver so that the driving voltage of the red/green/blue LED arrays 41, 42 and 43 set by the dimming/size setter 31 is supplied to the red/green/blue LED arrays 41, 42, and 43, respectively.

Figure 3:
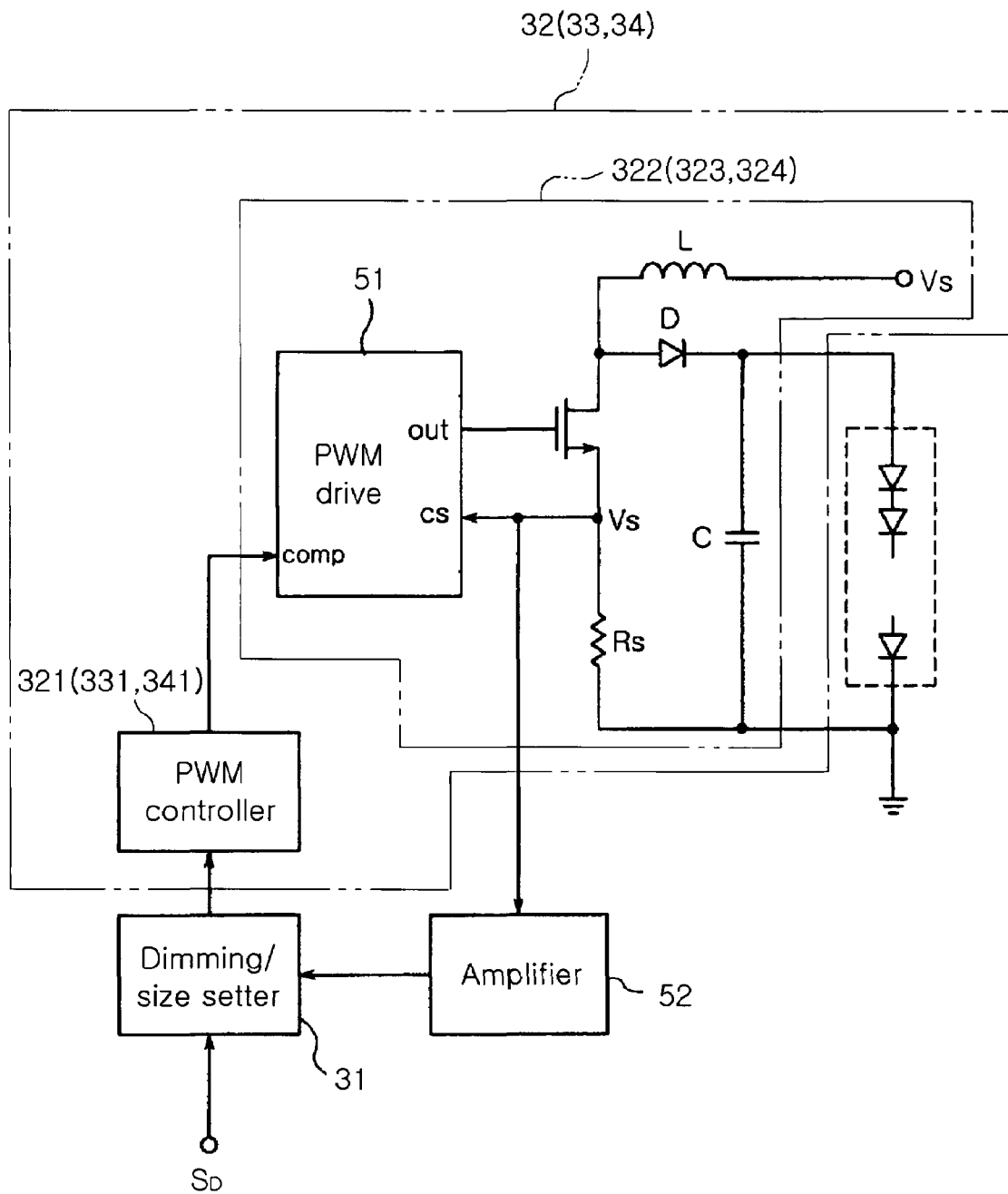
FIG. 3 is a detailed circuit diagram illustrating an apparatus for driving LED arrays according to an embodiment of the invention.

FIG. 3 illustrates an exemplary apparatus for driving LED arrays according to the invention. FIG. 3 is a detailed circuit diagram illustrating the apparatus for driving LED arrays according to an embodiment of the invention.

FIG. 3 depicts an LED driving circuit employing a boost type DC/DC converter but the invention is not limited thereto. The invention may be applied to an LED driving circuit employing a PWM-based DC/DC converter. Referring to FIG. 3, the LED array driving circuit 32 according to an embodiment of the invention can be provided with a boost-type DC/DC converter 322 including a PWM driver 51. Here, the PWM driver 51 supplies to a switch TR a switching pulse, which is adjustable in its width in response to a voltage Vs detected from a voltage detection resistor Rs, to control on/off time of the switch TR. An output terminal of the DC/DC converter 322 is connected to an LED array 110 including at least one LED.

Also, the apparatus for driving LED arrays according to the embodiment of the invention includes a dimming/size setter 31 and a PWM controller 321. The dimming/size setter 31 compares a voltage Vs detected from the voltage detection resistor Rs with an arbitrary dimming control signal $S_D$ and sets an appropriate driving voltage for the LED arrays to output a set signal. The PWM controller 321 outputs a PWM control signal for controlling a duty ratio of the switching pulse of the PWM driver 51 in response to the set signal outputted from the dimming/size setter 31. According to this embodiment, the PWM controller 321 generates a PWM control signal to increase on-time of the switching pulse outputted from the PWM driver 51, with increase in the voltage Vs compared by the dimming/size setter 31. On the other hand, the PWM controller 321 generates a PWM control signal to decrease on-time of the switching pulse outputted from the PWM driver 51, with decrease in the voltage Vs compared by the dimming/size setter 31. This completes the apparatus for driving LED arrays which controls width of the switching pulse outputted from the PWM driver 51 in response to the dimming control signal $S_D$ to adjust brightness of the LEDs. Additionally, the driving apparatus may further include an amplifier 52 for amplifying the voltage Vs detected from the voltage detection resistor Rs to supply to the dimming/size setter 31.

Figure 4:
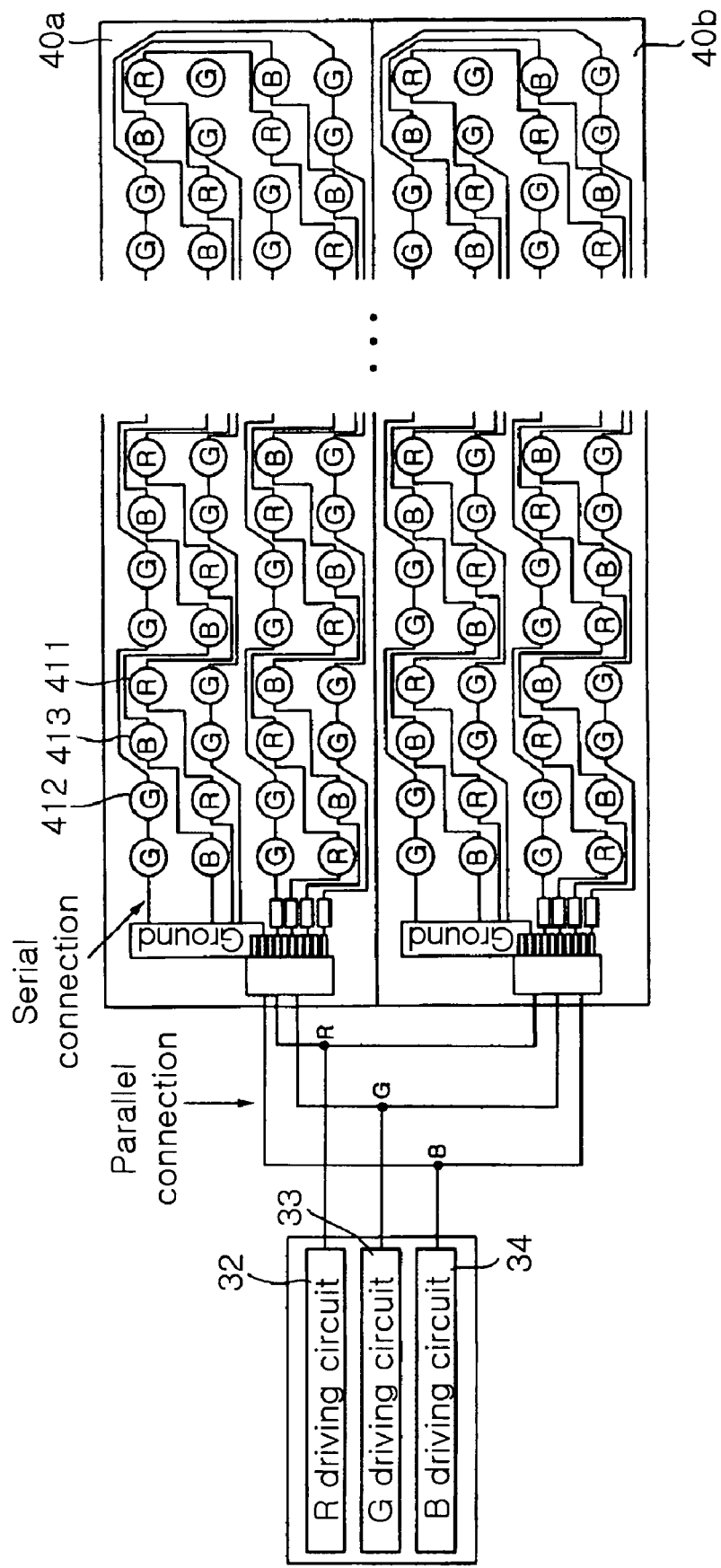
FIG. 4 is a schematic view illustrating exemplary LED arrays according to the invention.

FIG. 4 is a schematic view illustrating another exemplary LED arrays according to the invention.

Referring to FIG. 4, LED arrays may be disposed in separate areas 40a and 40b of a board, respectively. The LED arrays can be fabricated as one module in place of being located in separate areas. Here, the module is disposed to correspond to the separate areas, thus substantially identical in terms of arrangement. In each of the separate areas, the LEDs of the same color out of a plurality of red, green and blue LEDs 411, 412 and 413 are connected in series with one another. The LEDs of the same color connected in series with one another in one of the separate areas 40a or 40b are connected in parallel with the LEDs of the same color connected in series with one another in the other area, thereby electrically connected to respective driving circuits 32, 33 and 34 of the corresponding colors. For example, as shown in FIG. 4, the LEDs 411, 412 and 413 of the same color arrayed in one of the separate area 40a are connected in series with one another between a terminal and a ground to be electrically connected to the driving circuits 32, 33 and 34. The LEDs of the same color arrayed in the other separate area 40b are connected in the same manner as described above. The LEDs of the same color connected in series with one another in one of the separate areas 40a or 40b are connected in parallel with the LEDs of the same color connected in series with one another in the other separate area 40a or 40b, thereby connected to the respective driving circuits 32, 33 and 34 of the corresponding colors.

That is, the LEDs 411, 412, and 413 of the same color are connected in series with one another in each of the separate areas. The LEDs 411, 412 and 413 of the same color connected in series with one another in one of the separate areas are connected in parallel with the LEDs of the same color connected in series with one another in the other separate area, thereby connected to the respective driving circuits 32, 33 and 34. Therefore, the LED arrays 411, 412 and 413 feature a combination of serial and parallel connections.

This LED array structure having the LEDs connected in series and parallel together overcomes a problem associated with only serial connection or parallel connection. That is, serial connection requires a very high voltage and parallel connection requires a very high driving current. Thus, a certain number of LEDs are connected in series with one another to be driven by appropriate driving voltage and a certain number of LEDs are connected in series with one another to be driven by appropriate driving current. This overcomes a problem arising from a connection structure of the LEDs that entails excessive driving voltage and driving current.

As set forth above, according to exemplary embodiments of the invention, in an apparatus for driving red, green and blue LED arrays used as a direct-type backlight, the number of parts necessary for the driving apparatus is reduced to achieve smaller size and cost-effectiveness.

While the present invention has been shown and described in connection with the preferred embodiments, it will be apparent to those skilled in the art that modifications and variations can be made without departing from the spirit and scope of the invention as defined by the appended claims.

What is claimed is:

1. An apparatus for driving light emitting diode arrays, comprising:
   a dimming/size setter for setting each of driving voltages for a plurality of red, green and blue light emitting diode arrays in response to at least one of a dimming signal and a size control signal inputted from outside;
   a plurality of red light emitting diode array driving circuits each commonly connected to the dimming/size setter, each of the red light emitting diode array driving circuits switching on/off a supply voltage by a phase width modulation to supply the driving voltage set by the dimming/size setter;
   a plurality of green light emitting diode array driving circuits each commonly connected to the dimming/size setter, each of the green light emitting diode array driving circuits switching on/off a supply voltage by a phase width modulation to supply the driving voltage set by the dimming/size setter; and
   a plurality of blue light emitting diode array driving circuits each commonly connected to the dimming/size setter, each of the blue light emitting diode array driving circuits switching on/off a supply voltage by a phase width modulation to supply the driving voltage set by the dimming/size setter.

2. The apparatus for driving light emitting diode arrays according to claim 1, wherein each of the red light emitting diode array driving circuits comprises:
   a DC/DC converter for switching on/off the supply voltage of the red light emitting diode arrays in accordance with a duty ratio of a pulse signal outputted from a phase width modulation driver to convert the supply voltage into the driving voltage; and
   a phase width modulation controller for generating a phase width modulation control signal to control the duty ratio of the pulse signal outputted from the phase width modulation driver so that the driving voltage of the red light emitting diode arrays set by the dimming/size setter is supplied to the red light emitting diode arrays.

3. The apparatus for driving LED arrays according to claim 1, wherein each of the green LED array driving circuits comprises:
   a DC/DC converter for switching on/off the supply voltage of the green light emitting diode arrays in accordance with a duty ratio of a pulse signal outputted from a phase width modulation driver to convert the supply voltage into the driving voltage; and
   a phase width modulation controller for generating a phase width modulation control signal to control the duty ratio of the pulse signal outputted from the phase width modulation controller so that the driving voltage of the green light emitting diode arrays set by the dimming/size setter is supplied to the green light emitting diode arrays.

4. The apparatus for driving LED arrays according to claim 1, wherein each of the blue LED array driving circuits comprises:
   a DC/DC converter for switching on/off the supply voltage of the blue light emitting diode arrays in accordance with a duty ratio of a pulse signal outputted from a phase width modulation driver to convert the supply voltage into the driving voltage; and a phase width modulation controller for generating a phase width modulation control signal to control the duty ratio of the pulse signal outputted from the phase width modulation driver so that the driving voltage of the blue light emitting diode arrays set by the dimming/size setter is supplied to the blue light emitting diode arrays.

* * * * *